United States Patent
Xiong et al.

(10) Patent No.: US 9,932,906 B2
(45) Date of Patent: Apr. 3, 2018

(54) GAS TURBINE ENGINE UNCONTROLLED HIGH THRUST DETECTION SYSTEM AND METHOD

(71) Applicant: HONEYWELL INTERNATIONAL INC., Morristown, NJ (US)

(72) Inventors: Yufei Xiong, Phoenix, AZ (US); Dave Faymon, Phoenix, AZ (US); Scot Coffey, Mesa, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 348 days.

(21) Appl. No.: 14/863,140

(22) Filed: Sep. 23, 2015

(65) Prior Publication Data

US 2017/0081974 A1    Mar. 23, 2017

(51) Int. Cl.
| | |
|---|---|
| *F02C 9/28* | (2006.01) |
| *F02C 9/46* | (2006.01) |
| *F02C 9/54* | (2006.01) |

(52) U.S. Cl.
CPC ............. *F02C 9/28* (2013.01); *F02C 9/46* (2013.01); *F02C 9/54* (2013.01); *F05D 2260/80* (2013.01); *F05D 2270/021* (2013.01); *F05D 2270/095* (2013.01)

(58) Field of Classification Search
CPC ...... F02C 9/28; F02C 9/54; F02C 9/46; F05D 2270/095; F05D 2260/80; F05D 2270/021
See application file for complete search history.

(56) References Cited

U.S. PATENT DOCUMENTS

| | | |
|---|---|---|
| 3,357,177 A | 12/1967 | Cornett |
| 6,321,525 B1 | 11/2001 | Rogers |
| 6,578,794 B1 | 6/2003 | Clark et al. |
| 6,655,126 B2 | 12/2003 | Walker et al. |
| 6,931,835 B2 | 8/2005 | Chapman et al. |
| 7,493,752 B2 | 2/2009 | Horswill et al. |

(Continued)

FOREIGN PATENT DOCUMENTS

| | | |
|---|---|---|
| EP | 1411226 A1 | 4/2004 |
| FR | 2996254 A1 | 4/2014 |
| WO | 2013160626 A1 | 10/2013 |

OTHER PUBLICATIONS

Extended EP Search Report for Application No. 16189556.0-1607 dated Feb. 16, 2017.

*Primary Examiner* — Yuen H Wong
(74) *Attorney, Agent, or Firm* — Lorenz & Kopf, LLP

(57) ABSTRACT

A system and method of detecting an uncontrolled high thrust (UHT) condition in a turbofan gas turbine engine includes processing data to determine when a current commanded fan speed value is greater than a predetermined speed value. A current UHT commanded fan speed value is processed to determine if it will cause a target fan speed value to increase, remain steady, or decrease. The target fan speed value is set equal to the current UHT commanded fan speed value when the current UHT commanded fan speed value will cause the target fan speed value to increase or remain steady, and to a deceleration threshold value when the current UHT commanded fan speed value will cause the target fan speed value to decrease. An uncontrolled high thrust alert signal is generated when actual engine fan speed exceeds the target fan speed value by a predetermined amount for a preset time period.

20 Claims, 5 Drawing Sheets

(56) References Cited

U.S. PATENT DOCUMENTS

| | | |
|---|---|---|
| 8,904,804 B2 | 12/2014 | Tezuka et al. |
| 9,689,316 B1 * | 6/2017 | Crom .................. F02C 9/22 |
| 2015/0082802 A1 | 3/2015 | Cointe et al. |

* cited by examiner

GAS TURBINE ENGINE UNCONTROLLED HIGH THRUST DETECTION SYSTEM AND METHOD

TECHNICAL FIELD

The present invention generally relates to gas turbine engine controls, and more particularly relates to a system and method for detecting an uncontrolled high thrust condition in gas turbine engines.

BACKGROUND

Although highly unlikely, it is postulated that single or multiple component failures can result in an uncontrolled high thrust condition. Such a condition may include the actual engine thrust increasing to significantly higher levels than what is being commanded and/or remaining high when low thrust is commanded. For example, though highly unlikely, it is postulated that if the means of metering fuel to the engine (e.g., the fuel metering valve) were to fail in a fixed position, then the pilot may lose the ability to control engine thrust via the thrust/power/throttle levers or the auto-throttle. If the fuel metering means were to fail at the maximum fuel flow position, then engine thrust will continue to increase until either an engine limit is reached or the pilot initiates an intervening action. The engine limit may be, for example, an engine control limit, such as an overspeed protective system, or an inherent limit, such as an engine stall. Intervening actions may include, for example, manually shutting down the affected engine.

Presently, most regulatory bodies address the postulated uncontrolled high thrust condition by relying on crew intervention. That is, it is presently asserted that a flight crew will readily recognize the condition and manually shutdown the affected engine. Engineering studies and service experience indicate that this assertion is not always valid. Moreover, as may be appreciated, even if a flight crew were to recognize the postulated uncontrolled high thrust condition and thus shut down the affected engine, that engine is now unavailable to provide electrical, hydraulic, and/or pneumatic power to the aircraft.

Hence, there is a need for a system and method for detecting an uncontrolled high thrust condition in turbofan gas turbine engines that does not rely, at least solely, on flight crew recognition. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a method of detecting an uncontrolled high thrust (UHT) condition in a turbofan gas turbine engine includes processing data to determine when a current commanded fan speed value is greater than a predetermined speed value. A current UHT commanded fan speed value is set to the greater of the current commanded fan speed value and the predetermined speed value. The current UHT commanded fan speed value is processed to determine if the current UHT commanded fan speed value will cause a target fan speed value to increase, remain steady, or decrease. The target fan speed value is set equal to the current UHT commanded fan speed value when the current UHT commanded fan speed value will cause the target fan speed value to increase or remain steady, or is set equal to a deceleration threshold value when the current UHT commanded fan speed value will cause the target fan speed value to decrease. An uncontrolled high thrust alert signal is generated when actual engine fan speed exceeds the target fan speed value by a predetermined amount for a preset time period.

In another embodiment, a turbofan gas turbine engine uncontrolled high thrust (UHT) condition detection system includes a plurality of data sources and an engine control. The data sources are configured to supply data. The engine control is coupled to receive at least a portion of the data supplied by the data sources and is configured, upon receipt of the data, to determine a current commanded fan speed value, determine when the current commanded fan speed value is greater than a predetermined speed value, set a UHT commanded fan speed value to the greater of the current commanded fan speed value and the predetermined speed value, determine if the current UHT commanded fan speed value will cause a target fan speed value to increase, remain steady, or decrease, set the target fan speed value equal to (i) the current UHT commanded fan speed value when the current UHT commanded fan speed value will cause the target fan speed value to increase or remain steady, or (ii) a deceleration threshold value when the current UHT commanded fan speed value will cause the target fan speed value to decrease, generate an uncontrolled high thrust alert signal when actual engine fan speed exceeds the target fan speed value by a predetermined amount for a preset time period.

In yet another embodiment, a turbofan gas turbine engine control system includes a turbofan gas turbine engine, a plurality of data sources, and an engine control. The data sources are configured to supply data. The engine control is in operable communication with the turbofan gas turbine engine and is coupled to receive at least a portion of the data supplied by the data sources. The engine control is configured, upon receipt of the data, to determine a current commanded fan speed value for the turbofan gas turbine engine, determine when the current commanded fan speed value is greater than a predetermined speed value, set a uncontrolled high thrust (UHT) commanded fan speed value to the greater of the current commanded fan speed value and the predetermined speed value, determine, if the current UHT commanded fan speed value will cause a target fan speed value to increase, remain steady, or decrease, set the target fan speed value equal to (i) the current UHT commanded fan speed value when the current UHT commanded fan speed value will cause the target fan speed value to increase or remain steady, or (ii) a deceleration threshold value when the current UHT commanded fan speed value will cause the target fan speed value to decrease, and generate an uncontrolled high thrust alert signal when actual engine fan speed exceeds the target fan speed value by a predetermined amount for a preset time period.

Furthermore, other desirable features and characteristics of the uncontrolled high thrust detection system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments.

All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description. In this regard, although embodiments described herein are directed toward a turbofan gas turbine engine, it will be appreciated that the described embodiments could be implemented in other types of gas turbine engines.

Figure 1:
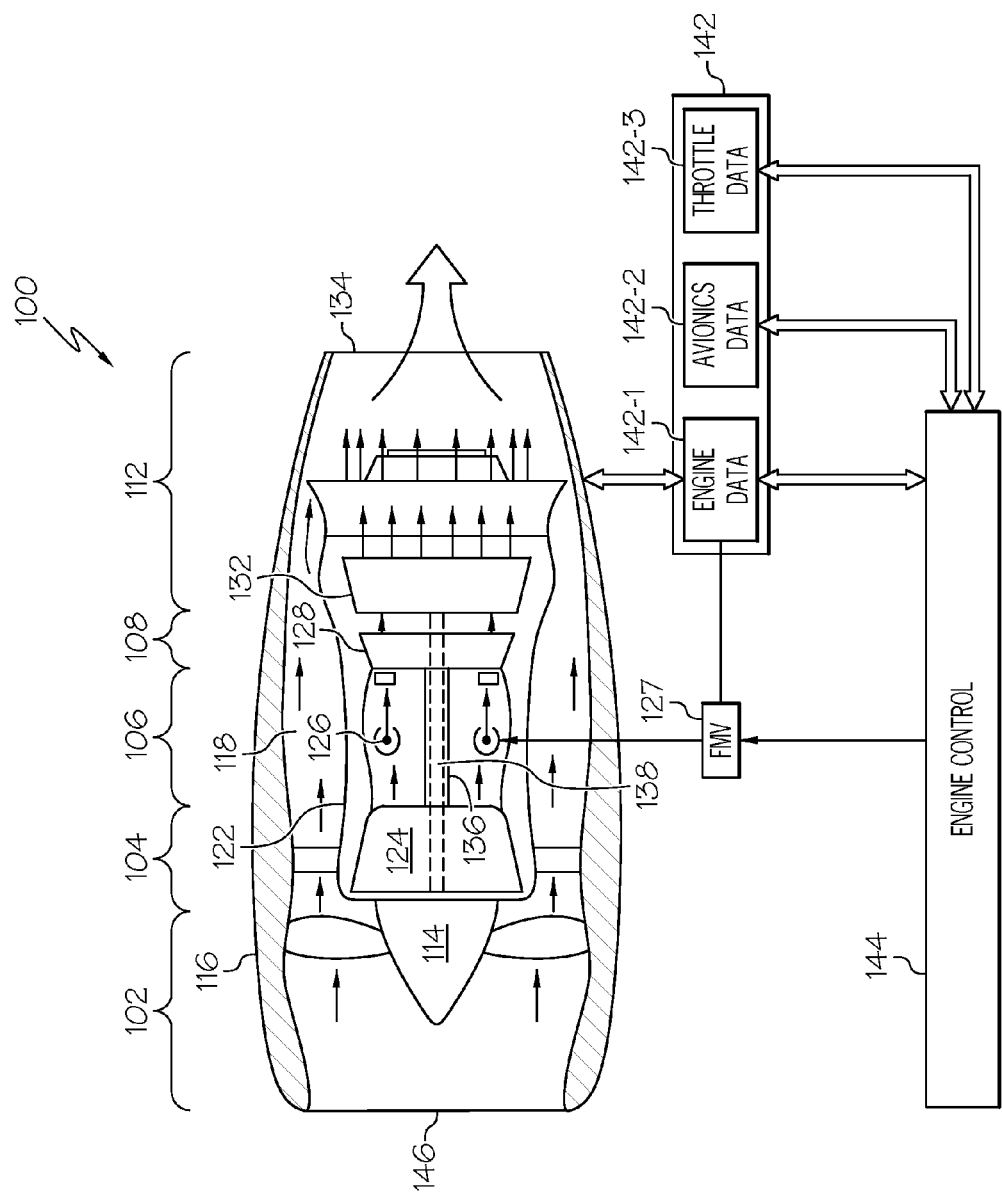
FIG. 1 depicts a functional block diagram of an exemplary gas turbine engine control system.

Turning now to FIG. 1, a functional block diagram of an exemplary gas turbine engine control system is depicted. The depicted system is for a multi-spool turbofan gas turbine engine 100, which includes an intake section 102, a compressor section 104, a combustion section 106, a turbine section 108, and an exhaust section 112. The intake section 102 includes a fan 114, which is mounted in a fan case 116. The fan 114 draws air into the intake section 102 and accelerates it. A fraction of the accelerated air exhausted from the fan 114 is directed through a bypass section 118 disposed between the fan case 116 and an engine cowl 122, and provides a forward thrust. The remaining fraction of air exhausted from the fan 114 is directed into the compressor section 104.

The compressor section 104 may include one or more compressors 124, which raise the pressure of the air directed into it from the fan 114, and directs the compressed air into the combustion section 106. In the depicted embodiment, only a single compressor 124 is shown, though it will be appreciated that one or more additional compressors could be used. In the combustion section 106, which includes a combustor assembly 126, the compressed air is mixed with fuel that is controllably supplied to the combustor assembly 126 from a non-illustrated fuel source via a fuel metering valve 127. The fuel and air mixture is combusted, and the high energy combusted air mixture is then directed into the turbine section 108.

The turbine section 108 includes one or more turbines. In the depicted embodiment, the turbine section 108 includes two turbines, a high pressure turbine 128, and a low pressure turbine 132. However, it will be appreciated that the engine 100 could be configured with more or less than this number of turbines. No matter the particular number, the combusted air mixture from the combustion section 106 expands through each turbine 128, 132, causing it to rotate. The combusted air mixture is then exhausted through an exhaust nozzle 134 disposed in the exhaust section 112, providing additional forward thrust. As the turbines 128 and 132 rotate, each drives equipment in the engine 100 via concentrically disposed shafts or spools. Specifically, the high pressure turbine 128 drives the compressor 124 via a high pressure spool 136, and the low pressure turbine 132 drives the fan 114 via a low pressure spool 138.

The depicted engine 100 additionally includes a plurality of data sources 142 and an engine control 144. The data sources 142 may vary in type and number, but may include at least an engine data source 142-1, an avionics data source 142-2, and a throttle data source 142-3. The engine data source 142-1 is coupled to the turbofan gas turbine engine 100 and is configured to supply engine data representative of turbofan gas turbine engine operability. The engine data source 142-1 may be variously configured and implemented, but in the depicted embodiment the engine data source 142-1 is implemented using various sensors that are configured to supply data representative of various parameters associated with turbofan gas turbine engine operability. The parameters may also vary, but include at least fuel flow, fuel metering valve data, engine rotational speeds (both N1 and N2), and various engine temperatures and pressures, just to name a few.

The avionics data source 142-2 may be also be variously configured and implemented, but in the depicted embodiment the avionics data source 142-2 is implemented using known avionics equipment and sensors that are configured to supply avionics data representative of various avionics parameters. At least some of the avionics parameters are supplied to the engine control 144. The particular avionics parameters that are supplied to the engine control 144 may vary, but in the depicted embodiment include at least Mach number, altitude, and ambient temperature. It will be appreciated that one or more of these parameters may be provided by engine sensors, the avionics system, or may be derived from various pressure and/or temperature sensors.

The throttle data source 142-3 may also be variously configured and implemented, but in the depicted embodiment the throttle data source 142-3 is implemented using a non-illustrated throttle that is located, for example, in a non-illustrated cockpit. The throttle data source 142-3 is configured to supply, to the engine control 144, throttle command data representative of the desired level of engine thrust to be generated by the engine 100.

The engine control 144 may be coupled to receive data from various ones of the aircraft data sources 142. The engine control 144 is configured, upon receipt of these data, to control the operation of the turbofan gas turbine engine 100. In particular, and as is generally known, for turbofan gas turbine engines, such as the one depicted in FIG. 1, the control of engine thrust is realized through control of the engine fan speed (N1). As is also generally known, the fan speed set point (N1_DMD) is scheduled based on the aircraft throttle command data and various engine or avionics parameters such as, for example, Mach number, altitude, and ambient temperature. The engine control 144, in response to these inputs, controls the actual fan speed (N1) to match the fan speed set point (N1_DMD) by adjusting the fuel flow via, for example, the fuel metering valve 127.

In addition to controlling engine thrust, the engine control 144 is further configured, upon receipt of data from various ones of the engine or aircraft data sources 142, to determine when an uncontrolled high thrust (UHT) condition exists in the turbofan gas turbine engine 100. The engine control 144, upon making this determination, will generate an uncontrolled high thrust alert. Moreover, in some embodiments, the engine control 144 may be further configured, upon making this determination, to supply commands that cause corrective action(s) to be implemented. The particular corrective action that the engine control 144 causes to be implemented may vary. For example, the engine control 144 may supply commands that will vary the effective geometry of the engine to increase or decrease turbofan gas turbine engine rotational speed, or that will shut the engine down. The manner in which the engine control determines that a potential for an uncontrolled high thrust condition exists may also vary. One particular process is depicted in flowchart form in FIG. 2, and with reference thereto will now be described.

Figure 2:
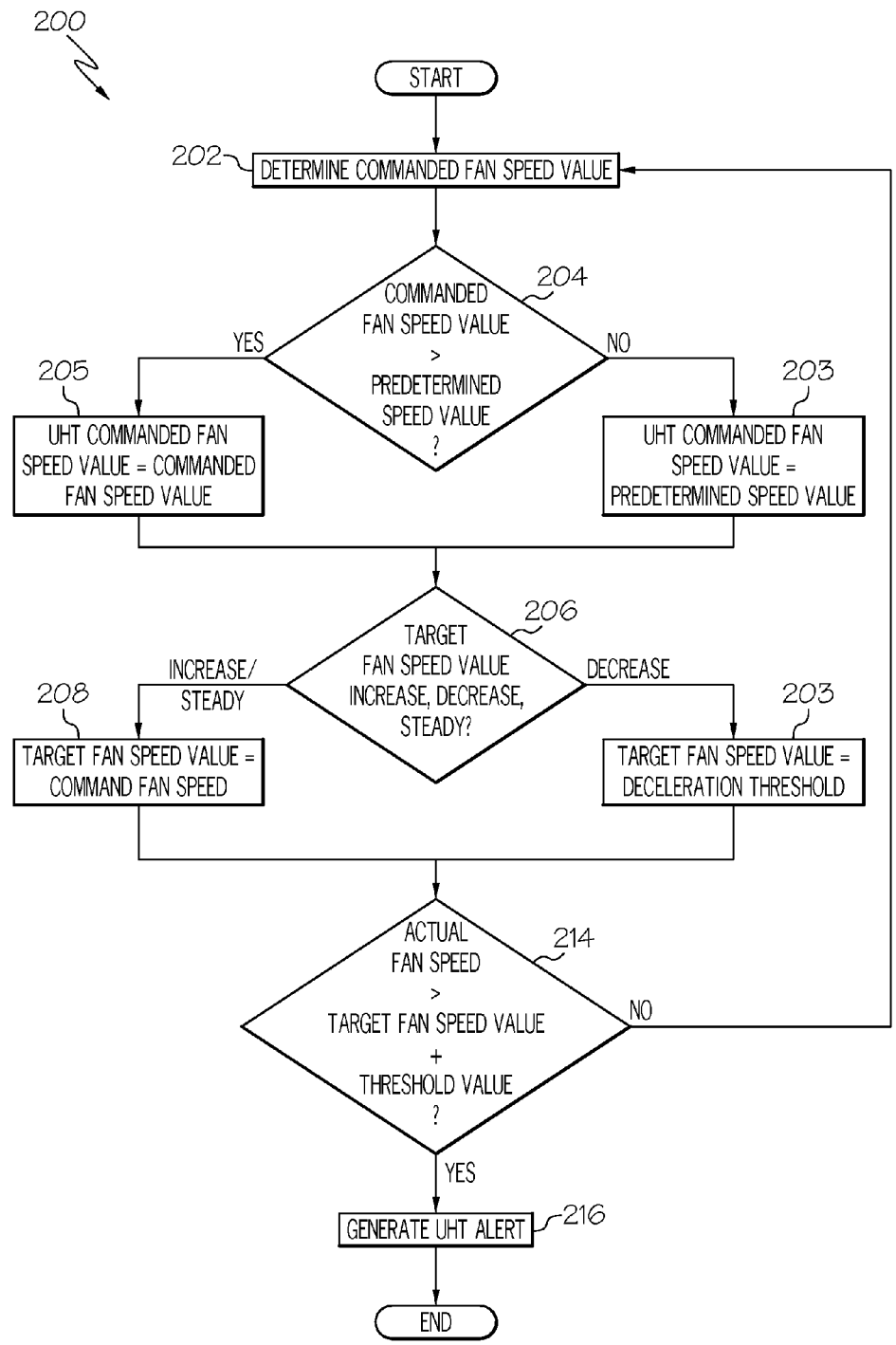
FIG. 2 depicts one embodiment of a generalized process, in flowchart form, for detecting an uncontrolled high thrust condition in a turbofan gas turbine engine, such as the one depicted in FIG. 1.

As depicted in FIG. 2, the engine control 144, upon initiation of the process 200, processes data from one or more of the data sources 142 to determine the commanded fan speed (202), and whether or not the commanded fan speed is greater than a predetermined speed value (204). If the commanded fan speed is not greater than the predetermined speed value, then a UHT commanded fan speed value, which is the fan speed command value used by the UHT logic (described below and depicted in FIGS. 3 and 4), is set equal to the predetermined speed value (203). This provides a minimum fan speed (or thrust) below which an uncontrolled high thrust condition is not a concern. If, however, the commanded fan speed is greater than the predetermined speed value, then the UHT commanded fan speed value is set equal to the commanded fan speed value (205). The engine control 144 then determines whether the UHT commanded fan speed value will cause a parameter, which is referred to herein as the target fan speed value, to increase, decrease, or remain steady (206).

If it is determined that the UHT commanded fan speed value will cause the target fan speed value to increase (or remain steady), the engine control 144 sets the target fan speed value to equal to the UHT commanded fan speed value (208). If it is determined, however, that the UHT commanded fan speed value will cause the target fan speed value to decrease, the engine control 144 sets the target fan speed value to equal to a deceleration threshold value (212). In both instances, the engine control then determines if the actual fan speed exceeds the target fan speed value by a predetermined threshold value (214). If it does not, then the process loops back. However, when the actual fan speed does exceed the target fan speed value by the predetermined threshold value, and does so for a preset time period, the engine control 144 at least generates an uncontrolled high thrust alert signal (216).

Figure 3:
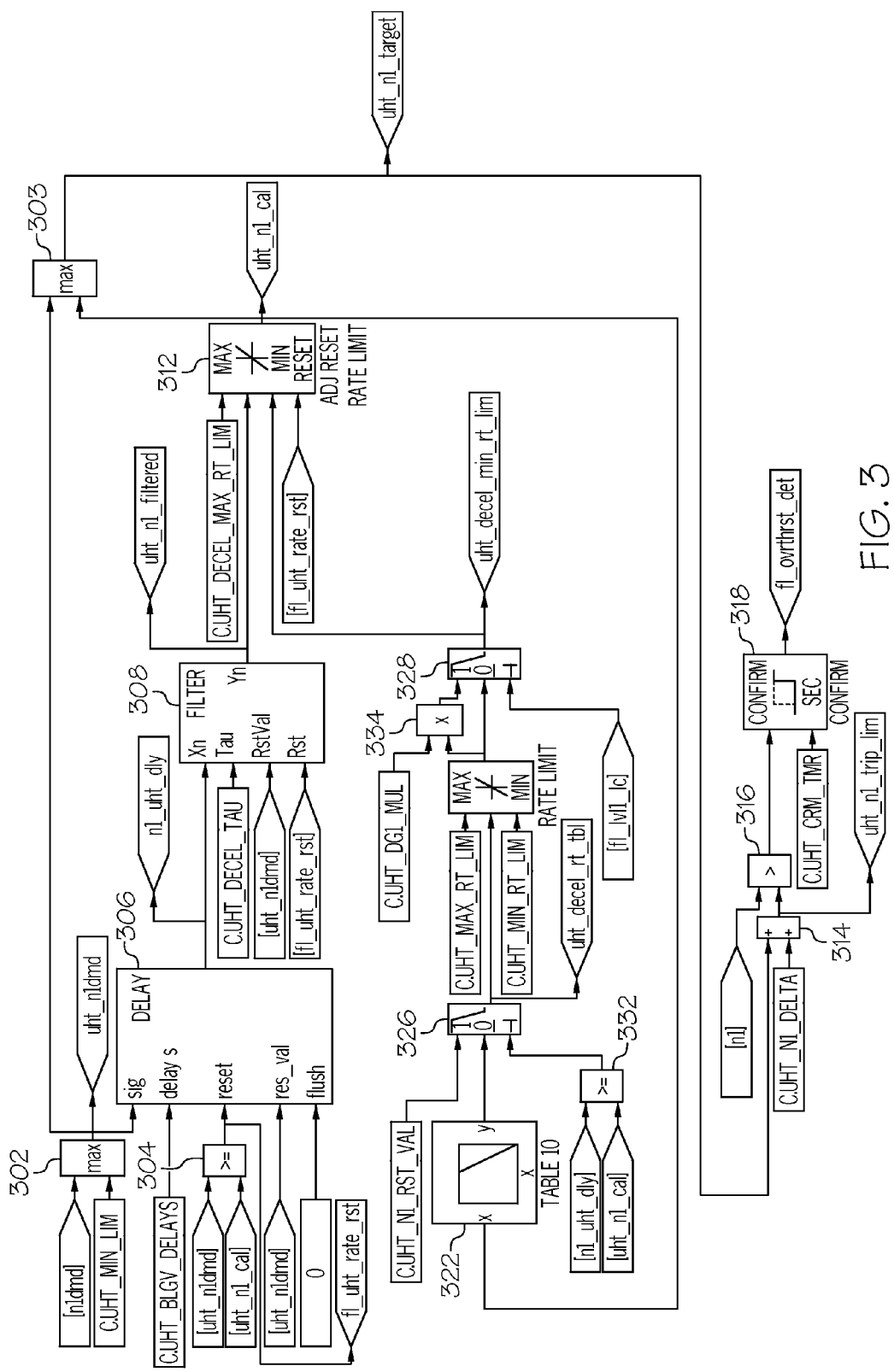
FIG. 3 depicts, in more detail, and in the form of a functional logic diagram, the generalized process depicted in FIG. 2.
Figure 4:
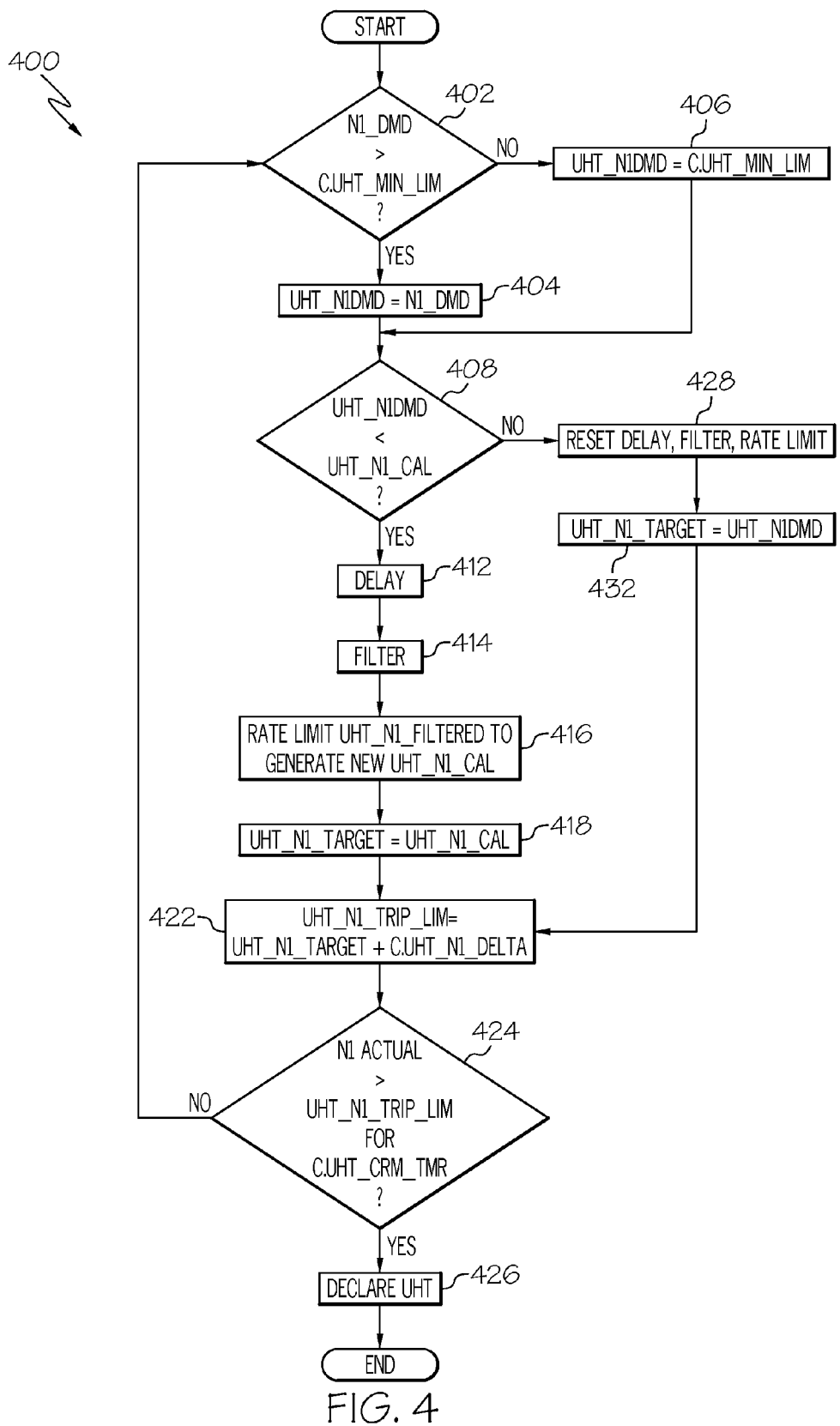
FIG. 4 depicts in more detail, and in the form of a flowchart, the generalized process depicted in FIG. 2.

Referring now to FIGS. 3 and 4, the general process described above and depicted in FIG. 2 will now be described in more detail. In particular, FIGS. 3 and 4 depict in more detail, and in the form of a functional logic diagram 300 and a flowchart 400, respectively, the above-described process. In describing the process in more detail, it is noted that the non-parenthetical reference numerals refer to logic blocks in FIG. 3, and the parenthetical reference numerals refer to flowchart blocks in FIG. 4.

Upon receipt of the current commanded fan speed value (n1_dmd), a first SELECT HIGH function 302 is implemented, which selects the higher of the commanded speed value or a predetermined minimum speed limit value (C.UHT_MIN_LIM). This corresponds to the decision block that determines whether the current commanded fan speed value is greater than the predetermined minimum speed limit value (402). If the current commanded fan speed value is greater than the predetermined minimum speed limit value, then the output of the first SELECT HIGH function 302, which is the previously mentioned UHT commanded fan speed value (uht_n1dmd), is set equal to the current commanded fan speed value (n1_dmd) (404). If not, then the UHT commanded fan speed value (uht_n1dmd) is set equal to the predetermined minimum speed limit value (C.UHT_MIN_LIM) (406).

Thereafter, the determination is made as to whether the current UHT commanded fan speed value (uht_n1dmd) will cause the target fan speed value (uht_n1_target) to increase (or remain steady) or decrease. To do so, a first RELATIONAL (>=) function 304 is implemented to make a determination as to whether the current UHT commanded fan speed value (uht_n1dmd) is less than the current deceleration threshold value (uht_n1_cal) (408). If the current UHT commanded fan speed value (uht_n1dmd) is indeed less than the current deceleration threshold value (uht_n1_cal), then the current UHT commanded fan speed value (uht_n1dmd) will cause the target fan speed value (uht_n1_target) to decrease. Conversely, if the current UHT commanded fan speed value (uht_n1dmd) is not less than (i.e., greater than or equal to) the current deceleration threshold value (uht_n1_cal), then the current UHT commanded fan speed value (uht_n1dmd) will cause the target fan speed value (uht_n1_target) to increase (or remain steady).

If it is determined that the current UHT commanded fan speed value (uht_n1dmd) will cause the target fan speed value (uht_n1_target) to decrease, then the current UHT commanded fan speed value (uht_n1dmd) is processed through a DELAY 306 to thereby generate a delayed fan speed command (uht_n1_dly) (412). The delayed fan speed command (uht_n1_dly) is then processed through a FILTER 308 to thereby generate a filtered fan speed command (uht_n1_filtered) (414). Then, the filtered fan speed command (uht_n1_filtered) is processed through a first RATE LIMITER 312, to thereby generate a new deceleration threshold value (uht_n1_cal) (416). It is noted that the DELAY 306, FILTER 308, and RATE LIMITER 312 ensure that the resulting target fan speed value (uht_n1_target) does not lead the actual engine speed during an engine deceleration.

As is generally known, a RATE LIMITER, such as the one depicted in FIG. 3, is configured to limit the rate of change of the input, which in this embodiment is the filtered fan speed command (uht_n1_filtered). In particular, the first RATE LIMITER 312 is configured to limit the rate of change of the filtered fan speed command (uht_n1_filtered) to a maximum positive rate of change limit (C.UHT_DECEL_MAX_RT_LIM) and a maximum negative rate of change limit (uht_decel_min_rt_lim). The maximum positive rate of change limit (C.UHT_DECEL_MAX_RT_LIM) is set to a constant value. It should be noted that the value for the maximum positive rate of change limit (C.UHT_DECEL_MAX_RT_LIM) is set relatively high (e.g., 10,000%/sec) so as to not perceptibly impact positive rates of change of the filtered fan speed command (uht_n1_filtered). However, and as will be described in more detail further below, the maximum negative rate of change limit (uht_decel_min_rt_lim) may vary.

Returning once again to FIGS. 3 and 4, it is seen that a second SELECT HIGH function 303 is implemented to select the higher of the current UHT commanded fan speed value (uht_n1dmd) or the current deceleration threshold value (uht_n1_cal). Because, in the presently described example, the current UHT commanded fan speed value (uht_n1dmd) is less than the deceleration threshold value (uht_n1_cal) that was just generated, the output of the second the SELECT HIGH function 303, which is the target fan speed value (uht_n1_target), is set equal to the deceleration threshold value (uht_n1_cal) (418).

The target fan speed value (uht_n1_target) is supplied to an ADDER function 314, which adds the target fan speed value (uht_n1_target) to the predetermined threshold value (C.UHT_N1_DELTA), to thereby generate an uncontrolled high thrust trip limit (uht_n1_trip_lim) (422). The uncontrolled high thrust trip limit (uht_n1_trip_lim) is then compared, via a RELATIONAL (>) function 316, to the actual fan speed (n1) of the turbofan gas turbine engine to determine if the actual fan speed (n1) exceeds the uncontrolled high thrust trip limit (uht_n1_trip_lim) for the preset time period (424) (C.UHT_CRM_TMR). If the actual fan speed (n1) exceeds the uncontrolled high thrust trip limit (uht_n1_trip_lim) for the preset time period (C.UHT_CRM_TMR), then the uncontrolled high thrust alert signal (fl_ovrthrst_det) is generated (426). If not, then the process 400 repeats. It is noted that the preset time period is implemented via a CONFIRM function 318 that is configured to transition from a LOW-logic state to a HIGH-logic state when the actual fan speed (n1) exceeds the uncontrolled high thrust trip limit (uht_n1_trip_lim) for the preset time period (C.UHT_CRM_TMR).

With reference back to functional block 304 in FIG. 3 and decision block 408 in FIG. 4, if it was instead determined that the current UHT commanded fan speed value (uht_n1dmd) will cause the target fan speed value (uht_n1_target) to increase (or remain steady), then the DELAY 306, the FILTER 308, and the first RATE LIMITER 312 are all reset (428). As a result, the current UHT commanded fan speed value (uht_n1dmd) is not delayed, filtered, and rate limited, and the output of the second the SELECT HIGH function 303, which is the target fan speed value (uht_n1_target), is set equal to the current UHT commanded fan speed value (uht_n1dmd) (432). As may be appreciated, by not delaying, filtering, or rate limiting the current UHT commanded fan speed value (uht_n1dmd), the target fan speed value (uht_n1_target) is instantly raised to the current UHT commanded fan speed value (uht_n1dmd).

Thereafter, the target fan speed value (uht_n1_target) is added to the predetermined threshold value (C.UHT_N1_DELTA), using the ADDER function 314, to thereby generate the uncontrolled high thrust trip limit (uht_n1_trip_lim) (422). The uncontrolled high thrust trip limit (uht_n1_trip_lim) is then compared, via the RELATIONAL (>) function 316, to the actual fan speed (n1) of the turbofan gas turbine engine to determine if the actual fan speed (n1) exceeds the uncontrolled high thrust trip limit (uht_n1_trip_lim) for the preset time period (424). If the actual fan speed (n1) exceeds the uncontrolled high thrust trip limit (uht_n1_trip_lim) for the preset time period, then the uncontrolled high thrust alert signal (fl_ovrthrst_det) is generated (426). If not, then the process 400 repeats.

It was previously noted that the maximum negative rate of change limit (uht_decel_min_rt_lim) may vary. For completion, and with reference now solely to FIG. 3, a description of the manner in which the maximum negative rate of change limit (uht_decel_min_rt_lim) is generated and varied will be provided. To provide this functionality, the engine control 144 implements a LOOK-UP TABLE 322, a second RATE LIMITER 324, a first LOGIC SWITCH 326, a second LOGIC switch 328, and a second RELATIONAL (>=) function 332. These functions are configured such that the deceleration minimum rate limit value (uht_decel_min_rt_lim) that is generated is a function of the current deceleration threshold value (uht_n1_cal). Moreover, the rate of change of the deceleration minimum rate limit value (uht_decel_min_rt_lim) is limited, via the second RATE LIMITER 324, to a predetermined deceleration limit value.

More specifically, the LOOK-UP TABLE 322 includes stored deceleration rate limit values (in units of %/second). The deceleration rate limit value that is supplied from the LOOK-UP TABLE 322 is a function of the current deceleration threshold value (uht_n1_cal). It will be appreciated that the deceleration rate limit values may vary, but preferably comprise a one-dimensional interpolation of input values that are clamped at upper and lower boundaries. For example, when the current deceleration threshold value (uht_n1_cal) is at the upper boundary (e.g., 100%), the deceleration rate limit value is set to −8, and when the current deceleration threshold value (uht_n1_cal) is at the lower boundary (e.g., 50%), the deceleration rate limit value is set to zero (0). For current deceleration threshold values (uht_n1_cal) between the upper and lower boundaries, the deceleration rate limit value is set to the linear interpolation at the upper and lower boundaries. For example, using the values just described, if the current deceleration threshold value (uht_n1_cal) is 75% (e.g., halfway between 50% and 100%), then the deceleration rate limit value will be set to −4 (e.g., halfway between 0 and −8). It will be appreciated that in other embodiments, the schedule could have non-linear characteristics and/or could have other inputs, such as temperature, altitude, or the like.

The second RATE LIMITER 324 generates and supplies the maximum negative rate of change limit (uht_decel_min_rt_lim) to the first RATE LIMITER 312. The second RATE LIMITER 324, together with the first LOGIC SWITCH 326 and the second RELATIONAL (>=) function 332, limits the rate at which the maximum negative rate of change limit (uht_decel_min_rt_lim) ramps up from a predetermined reset value (C.UHT_N1_RST_VAL) to the deceleration rate limit value supplied from LOOK-UP TABLE 322. That is, the rate at which the deceleration rate limit value supplied from LOOK-UP TABLE 322 may vary from the predetermined reset value (C.UHT_N1_RST_VAL) to the current value is rate limited to the values of the maximum positive acceleration limit (C.UHT_MAX_RT_LIM) and the maximum deceleration limit (C.UHT_MIN_RT_LIM), both of which are constant values.

In particular, when the delayed fan speed command (uht_n1_dly), or in some embodiments, the filtered fan speed command (uht_n1_filtered), has increased, it may become greater than or equal to the current deceleration threshold value (uht_n1_cal). As such, the output of the second RELATIONAL (>=) function 332 will move the first LOGIC SWITCH 326 to the logical-1 position, thereby supplying the predetermined reset value (C.UHT_N1_RST_VAL) to the second RATE LIMITER 324. When the delayed fan speed command (uht_n1_dly), or in some embodiments, the filtered fan speed command (uht_n1_filtered), later decreases below the current deceleration threshold (uht_n1_cal), indicating that the deceleration threshold (uht_n1_cal) may start to decrease, the output of the second RELATIONAL (>=) function 332 will move the first LOGIC SWITCH 326 to the logical-0 position. As a result, the appropriate deceleration rate limit value from LOOK-UP TABLE 322 is supplied to the second RATE LIMITER 324. If the current output of the RATE LIMITER 324 is greater than the current deceleration rate limit value from LOOK-UP TABLE 322, the output of the RATE LIMITER 324 will slew to the value from the LOOK-UP TABLE 322 at a rate determined by the maximum deceleration limit (C.UHT_MIN_RT_LIM). It will be appreciated that the value of the predetermined reset value (C.UHT_N1_RST_VAL) may vary. In one embodiment, for example, it is set to a value of 0%/second.

It should be noted that the maximum positive acceleration limit (C.UHT_MAX_RT_LIM) is set relatively high (e.g., 10,000%/sec$^2$) so as to not perceptibly impact positive rates of change of deceleration rate limit values. The maximum deceleration limit (C.UHT_MIN_RT_LIM) is, however, set to a value to appropriately impact negative rates of change of deceleration rate limit values. In one embodiment, and by way of example only, the maximum deceleration limit (C.UHT_MIN_RT_LIM) is set to −30%/sec$^2$.

As FIG. 3 also depicts, the engine control 144 may also implement a MULTIPLIER 334. The MULTIPLIER 334, together with the second LOGIC SWITCH 328, selectively reduces the output of the second RATE LIMITER 324. In particular, when a degraded engine mode command (fl_lvl1_lc) is received, indicating that engine acceleration and deceleration rates have been reduced due to, for example, some system malfunction, the second LOGIC SWITCH 328 moves to the logical-1 position. As a result, the output of the second RATE LIMITER 324 is multiplied, via the MULTIPLIER 334, by a predetermined degradation multiplier (C.UHT.DG1_MUL), thereby reducing the deceleration minimum rate limit value by a predetermined amount. It will be appreciated that the value of the predetermined degradation multiplier (C.UHT.DG1_MUL) may vary. In one embodiment, for example, it is set to a value of 0.5, thereby cutting the deceleration minimum rate limit value in half. This functionality is implemented when in a degraded engine mode, because in this mode the acceleration and deceleration rates of the engine are reduced by the same predetermined amount (e.g., cut in half).

Figure 5:
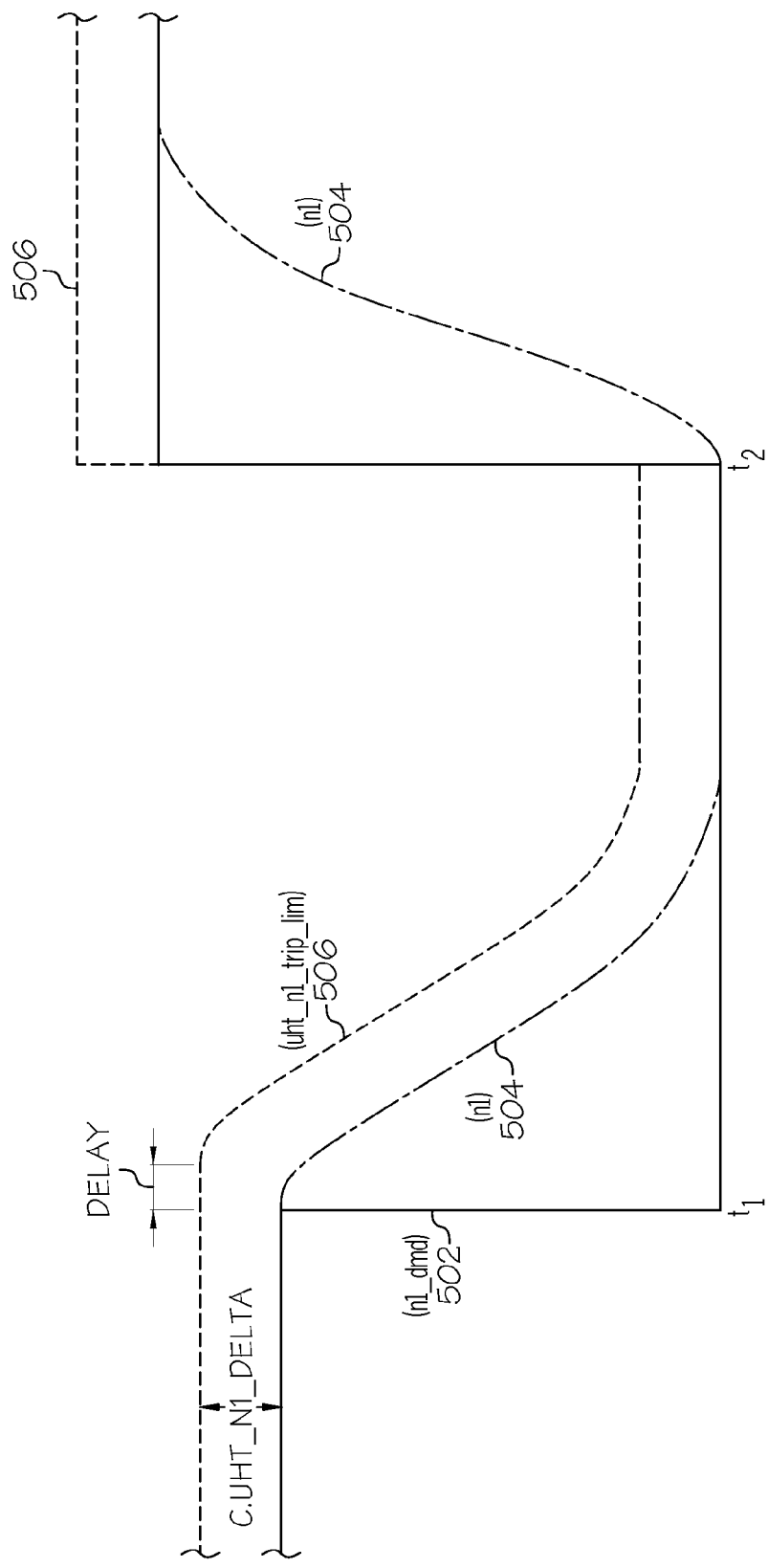
FIG. 5 graphically depicts various parameters associated with the processes depicted in FIGS. 2-4.

Attention should now be drawn to FIG. 5, which graphically depicts various parameters associated with the above-described processes. The line 502 in FIG. 5 represents the current commanded fan speed value (n1_dmd), line 504 represents the actual fan speed (n1) of the turbofan gas turbine engine, and line 506 represents the uncontrolled high thrust trip limit (uht_n1_trip_lim). Initially, the current commanded fan speed value (n1_dmd) 502 is one that is causing the target fan speed value (uht_n1_target) to remain in a steady state engine condition. Thus, the target fan speed value (uht_n1_target) is set equal to the current UHT commanded fan speed value (uht_n1dmd), which means the uncontrolled high thrust trip limit (uht_n1_trip_lim) 506 is the sum of the current commanded fan speed value (uht_n1_cal) and the predetermined threshold value (C.UHT_N1_DELTA).

At time (t1), the current commanded fan speed value (n1_dmd) 502 is changed such that it causes the target fan speed value (uht_n1_target) to decrease. Substantially immediately thereafter, the actual fan speed (n1) 504 of the engine 100 does indeed begin decreasing. However, the uncontrolled high thrust trip limit (uht_n1_trip_lim) 506 remains constant for the time period implemented by the DELAY 306. Thereafter (at t1+DELAY), the uncontrolled high thrust trip limit (uht_n1_trip_lim) 506 begins decreasing. However, as described above, it does not decrease at the normal rate (i.e., deceleration rate limit value that is supplied from the LOOK-UP TABLE 322). Instead, it is put through a filter, and then the rate of change of the filtered fan speed command (uht_n1_filtered), and thus the uncontrolled high thrust trip limit (uht_n1_trip_lim), varies from 0 to the normal rate limit linearly at the rate set by the maximum deceleration limit (C.UHT_MIN_RT_LIM).

At time (t2), the current commanded fan speed value (n1_dmd) 502 is changed such that it causes the target fan speed value (uht_n1_target) to increase. And, substantially immediately thereafter, the actual fan speed (n1) 504 of the engine 100 does indeed begin increasing. As described above, the DELAY 306, the FILTER 308, and the first RATE LIMITER 312 are all reset. In addition, the target fan speed value (uht_n1_target) is instantly set equal to the current UHT commanded fan speed value (uht_n1dmd), which means the uncontrolled high thrust trip limit (uht_n1_trip_lim) is instantly raised back to the sum of the current UHT commanded fan speed value (uht_n1 dmd) and the predetermined threshold value (C.UHT_N1_DELTA).

The processes described herein are preferably implemented in the engine control 144. It will be appreciated, however, that the processes may additionally, or instead, be implemented in other, non-illustrated devices associated with the engine 100 and/or aircraft in (or on) which the engine 100 is installed.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of detecting an uncontrolled high thrust (UHT) condition in a turbofan gas turbine engine, the method comprising:
processing data to determine when a current commanded fan speed value is greater than a predetermined speed value;
setting, by a processor, a current UHT commanded fan speed value to the greater of the current commanded fan speed value and the predetermined speed value;
processing the current UHT commanded fan speed value, to determine when the current UHT commanded fan speed value will cause a target fan speed value to increase, remain steady, or decrease;
setting the target fan speed value equal to (i) the current UHT commanded fan speed value when the current UHT commanded fan speed value will cause the target fan speed value to increase or remain steady, or (ii) a deceleration threshold value when the current UHT commanded fan speed value will cause the target fan speed value to decrease;
generating an uncontrolled high thrust alert signal when actual engine fan speed exceeds the target fan speed value by a predetermined amount for a preset time period; and
controlling, with an engine control, the actual engine fan speed by adjusting fuel flow to the turbofan gas turbine engine via a fuel metering valve.

2. The method of claim 1, further comprising:
processing the current UHT commanded fan speed value through a delay when the current UHT commanded fan speed value will cause the target fan speed value to decrease to thereby generate a delayed fan speed command;
processing the delayed fan speed command through a filter to thereby generate a filtered fan speed command; and
processing the filtered fan speed command through a rate limiter to limit a rate of change of the filtered fan speed command, to thereby generate the deceleration threshold value.

3. The method of claim 2, wherein the predetermined amount is a predetermined threshold value, and wherein the method further comprises:
adding the predetermined threshold value to the target fan speed value to thereby generate an uncontrolled high thrust trip limit;
comparing the actual engine fan speed to the uncontrolled high thrust trip limit; and
generating the uncontrolled high thrust alert signal when the actual engine fan speed exceeds the uncontrolled high thrust trip limit for the preset time period.

4. The method of claim 2, further comprising:
limiting the rate of change of the filtered fan speed command to a deceleration minimum rate limit value.

5. The method of claim 4, further comprising:
generating the deceleration minimum rate limit value as a function of the deceleration threshold value.

6. The method of claim 5, further comprising:
limiting a rate of change of the deceleration minimum rate limit value to a predetermined deceleration limit value.

7. The method of claim 4, further comprising:
processing data to determine when a degraded engine mode command is received; and
when the degraded engine mode command is received, reducing the deceleration minimum rate limit value by a predetermined amount.

8. The method of claim 2, further comprising:
resetting the delay, the filter, and the rate limiter upon determining that the current UHT commanded fan speed value will cause the target fan speed value to increase, whereby the UHT commanded fan speed value is not delayed, filtered, and rate limited.

9. The method of claim 8, further comprising:
adding the predetermined threshold value to the target fan speed value to thereby generate an uncontrolled high thrust trip limit;
comparing the actual engine fan speed to the uncontrolled high thrust trip limit; and generating the uncontrolled high thrust alert signal when the actual engine fan speed exceeds the uncontrolled high thrust trip limit for the preset time period.

10. The method of claim 1, further comprising:
comparing the current UHT commanded fan speed value to the deceleration threshold value;
determining that the current UHT commanded fan speed value will cause the target fan speed value to increase when the current UHT commanded fan speed value is greater than the deceleration threshold value; and
determining that the current UHT commanded fan speed value will cause the target fan speed value to decrease when the current UHT commanded fan speed value is less than the deceleration threshold value.

11. A turbofan gas turbine engine uncontrolled high thrust (UHT) condition detection system, comprising:
a plurality of sensors configured to supply data; and
an engine control, implemented with a processor, coupled to receive at least a portion of the data supplied by the plurality of sensors and configured, upon receipt of the data, to:
determine a current commanded fan speed value,
determine when the current commanded fan speed value is greater than a predetermined speed value,
set a UHT commanded fan speed value to the greater of the current commanded fan speed value and the predetermined speed value,
determine when the current UHT commanded fan speed value will cause a target fan speed value to increase, remain steady, or decrease,
set the target fan speed value equal to (i) the current UHT commanded fan speed value when the current UHT commanded fan speed value will cause the target fan speed value to increase or remain steady, or (ii) a deceleration threshold value when the current UHT commanded fan speed value will cause the target fan speed value to decrease,
generate an uncontrolled high thrust alert signal when actual engine fan speed exceeds the target fan speed value by a predetermined amount for a preset time period; and
control the actual engine fan speed by adjusting fuel flow to the turbofan gas turbine engine via a fuel metering valve.

12. The system of claim 11, wherein the engine control is further configured to:
process the current UHT commanded fan speed value through a delay when the current UHT commanded fan speed value will cause the target fan speed value to decrease to thereby generate a delayed fan speed command;
process the delayed fan speed command through a filter to thereby generate a filtered fan speed command; and
process the filtered fan speed command through a rate limiter to limit a rate of change of the filtered fan speed command, to thereby generate the deceleration threshold value.

13. The system of claim 12, wherein the predetermined amount is a predetermined threshold value, and wherein the engine control is further configured to:
add the predetermined threshold value to the target fan speed value to thereby generate an uncontrolled high thrust trip limit;
compare the actual engine fan speed to the uncontrolled high thrust trip limit; and
generate the uncontrolled high thrust alert signal when the actual engine fan speed exceeds the uncontrolled high thrust trip limit for the preset time period.

14. The system of claim 12, wherein the engine control is further configured to:
generate a deceleration minimum rate limit value as a function of the deceleration threshold value;
limit the rate of change of the filtered fan speed command to the deceleration minimum rate limit value; and
limit the rate of change of the deceleration minimum rate limit value to a predetermined deceleration limit value.

15. The system of claim 14, wherein the engine control is further configured to:
determine when a degraded engine mode command is received; and
when the degraded engine mode command is received, reduce the deceleration minimum rate limit value by a predetermined amount.

16. The system of claim 12, wherein the engine control is further configured to:
reset the delay, the filter, and the rate limiter upon determining that the current UHT commanded fan speed value will cause the target fan speed value to increase, whereby the UHT commanded fan speed value is not delayed, filtered, and rate limited;
add the predetermined threshold value to the target fan speed value to thereby generate an uncontrolled high thrust trip limit;
compare the actual engine fan speed to the uncontrolled high thrust trip limit; and
generate the uncontrolled high thrust alert signal when the actual engine fan speed exceeds the uncontrolled high thrust trip limit for the preset time period.

17. The system of claim 11, wherein the engine control is further configured to:
compare the current UHT commanded fan speed value to the deceleration threshold value;
determine that the current UHT commanded fan speed value will cause the target fan speed value to increase when the current UHT commanded fan speed value is greater than the deceleration threshold value; and
determine that the current UHT commanded fan speed value will cause the target fan speed value to decrease when the current UHT commanded fan speed value is less than the deceleration threshold value.

18. A turbofan gas turbine engine control system, comprising:
a turbofan gas turbine engine;
a plurality of sensors configured to supply data; and
an engine control, implemented with a processor, in operable communication with the turbofan gas turbine engine and coupled to receive at least a portion of the data supplied by the plurality of sensors the engine control configured, upon receipt of the data, to:
determine a current commanded fan speed value for the turbofan gas turbine engine,
determine when the current commanded fan speed value is greater than a predetermined speed value,
set a uncontrolled high thrust (UHT) commanded fan speed value to the greater of the current commanded fan speed value and the predetermined speed value,
determine, when the current UHT commanded fan speed value will cause a target fan speed value to increase, remain steady, or decrease,
set the target fan speed value equal to (i) the current UHT commanded fan speed value when the current UHT commanded fan speed value will cause the target fan speed value to increase or remain steady, or (ii) a deceleration threshold value when the current UHT commanded fan speed value will cause the target fan speed value to decrease,
generate an uncontrolled high thrust alert signal when actual engine fan speed exceeds the target fan speed value by a predetermined amount for a preset time period; and
control the actual engine fan speed by adjusting fuel flow to the turbofan gas turbine engine via a fuel metering valve.

19. The system of claim 18, wherein the predetermined amount is a predetermined threshold value, and wherein the engine control is further configured to:
process the current UHT commanded fan speed value through a delay when the current UHT commanded fan speed value will cause the turbofan gas turbine engine to decelerate to thereby generate a delayed fan speed command;
process the delayed fan speed command through a filter to thereby generate a filtered fan speed command;
generate a deceleration minimum rate limit value as a function of the deceleration threshold value;
limit the rate of change of the deceleration minimum rate limit value to a predetermined deceleration limit value;
process the filtered fan speed command through a rate limiter to limit a rate of change of the filtered fan speed command to the deceleration minimum rate limit value, to thereby generate the deceleration threshold value;
add the predetermined threshold value to the target fan speed value to thereby generate an uncontrolled high thrust trip limit;
compare the actual engine fan speed to the uncontrolled high thrust trip limit; and
generate the uncontrolled high thrust alert signal when the actual engine fan speed exceeds the uncontrolled high thrust trip limit for the preset time period.

20. The system of claim 19, wherein the engine control is further configured to:
reset the delay, the filter, and the rate limiter upon determining that the current UHT commanded fan speed value will cause the target fan speed value to increase, whereby the UHT commanded fan speed value is not delayed, filtered, and rate limited;
add the predetermined threshold value to the target fan speed value to thereby generate an uncontrolled high thrust trip limit;
comparing the actual engine fan speed to the uncontrolled high thrust trip limit; and
generate the uncontrolled high thrust alert signal when the actual engine fan speed exceeds the uncontrolled high thrust trip limit for the preset time period.

* * * * *